US007002580B1

(12) United States Patent
Aggala et al.

(10) Patent No.: US 7,002,580 B1
(45) Date of Patent: Feb. 21, 2006

(54) METHOD AND APPARATUS FOR AUTOMATICALLY GENERATING CHARTS

(75) Inventors: Ramakrishna Aggala, Alpharetta, GA (US); Udaya Bhaskar Natha, Alpharetta, GA (US); Bala Surya Siva Sri Gaddamanugu, Alpharetta, GA (US); Charles C. Giddens, Conyers, GA (US); Jacquenetta M. Mason, Duluth, GA (US); Harold Jeffrey Stewart, Alpharetta, GA (US)

(73) Assignee: AT&T Corp, New York, NY (US)

( * ) Notice: Subject to any disclaimer, the term of this patent is extended or adjusted under 35 U.S.C. 154(b) by 173 days.

(21) Appl. No.: 10/438,126

(22) Filed: May 14, 2003

(51) Int. Cl.
*G06T 11/20* (2006.01)
(52) U.S. Cl. ..................................................... 345/440
(58) Field of Classification Search ................. 345/440
See application file for complete search history.

(56) References Cited

U.S. PATENT DOCUMENTS

| 5,491,779 | A  | 2/1996 | Bezjian ........................ 395/140 |
| 5,535,324 | A  | 7/1996 | Alvarez et al. ............... 395/161 |
| 6,211,887 | B1 | 4/2001 | Meier et al. .................. 345/440 |
| 2003/0071814 | A1 * | 4/2003 | Jou et al. ....................... 345/440 |
| 2003/0128212 | A1 * | 7/2003 | Pitkow ........................... 345/440 |

FOREIGN PATENT DOCUMENTS

EP   1077420 A2   2/2001

OTHER PUBLICATIONS

Autodesk MapGuide Release 6 (User's Guide, Oct. 2001).*
New Release of Autodesk MapGuide (Autodesk's News-release, Aug. 9, 2000).*

* cited by examiner

*Primary Examiner*—Ryan Yang
(74) *Attorney, Agent, or Firm*—Hoffmann & Baron, LLP

(57) ABSTRACT

The present invention provides a method and apparatus for automatically generating charts, preferably in Microsoft® Excel format, for the users to be able to better analyze the network data. All the functions needed to generate are performed at the network server without installing any additional components on user's server, thereby independent of any third party software. Furthermore, minimal user input is required using any kind of application without modifications.

18 Claims, 7 Drawing Sheets

Fig. 3A

METHOD AND APPARATUS FOR AUTOMATICALLY GENERATING CHARTS

FIELD OF THE INVENTION

This invention relates generally to the representation of data in a graphical form, in particular, to a method of displaying the network data on charts.

BACKGROUND OF THE INVENTION

Generally, by default, Microsoft® Excel Application is installed on every user's PC. Most of the users are in need of generating various reports to better analyze the data and a majority of these users prefer to view the data on a chart for better analysis. Currently, there are some third party softwares which will generate charts. But, these components should be installed on a user's PC before user makes an attempt to generate a chart. Due to large number of users, using of any third party software for generating charts is generally not recommended.

The European Patent No. EP 1211624 A2 discloses a method and apparatus for automatically producing spreadsheet-based models. The method involves user manually imputing the data in a spreadsheet. The data in the spreadsheet is read cell by cell in order to generate charts such as either line or bar charts. This process is very time consuming for large volumes of data. Moreover, this method is very limited in its functionality because in order for user to have the charts generated for various applications, the user has to create different spreadsheets for each type of application and input data in each spreadsheet. Furthermore, if the applications are changed due to some enhancements, user has to change the spreadsheets to reflect the changes, thereby maintaining the spreadsheet templates. Finally, the users have to manually track all of his or her result chart files by saving them on PC while waiting to receive the final result chart.

Another European Patent No. EP 1077420 A2 discloses a system and method for visualizing multi-dimensional data in spreadsheets and other data structures. The method includes add-in functionalities to user's PC to include into Microsoft® Excel (EXCEL) and loading the multidimensional data structures such as Pivot Tables onto EXCEL worksheets. Furthermore, users are able to analyze these pivot tables having several hundred rows and columns and convert them into Bar Charts.

Therefore, a need exists for users not to have any other components installed on their PCs and not depend on any other third party software to display the network data on charts. Furthermore, the user input needs to be minimized to improve the overall process and any kind of application can be used without modifications.

SUMMARY OF THE INVENTION

A method of automatically generating charts is disclosed. This method comprises receiving search criteria from a user via a server, wherein said search criteria is pre-defined to meet the user's needs, retrieving data from various data sources based on the search criteria received and the application, wherein said data has various formats, formatting the data into different arrays, generating at least one or more charts from the different arrays, and presenting the chart to the user, wherein the chart is generated and presented without installing any additional component on the user's server.

BRIEF DESCRIPTION OF THE DRAWINGS

FIG. 3A shows a table of a usage reports result screen.

DETAILED DESCRIPTION OF THE INVENTION

The following detailed description of the various embodiments of the present invention below are described in connection with AT&T Geolink, Microsoft®EXCEL (EXCEL), Microsoft® Visual Basic(VISUAL BASIC), software applications. However, it will be appreciated that the invention is not limited to use of these applications.

In summary, the application provides users with a very broad search information according to the user's need, and will pull the data from various data sources based on a search criteria selected by the user. Furthermore, the data will be formatted by creating various two-dimensional arrays, which are then passed to geolink chart component to draw the chart. The geolink chart component will create the chart and load it onto user's browser. The application preferably generates all chart types supported by EXCEL. It is to be noted that the charts are generated and presented to the user without adding additional software or component to the user's server as will be described in detail below.

Figure 1:
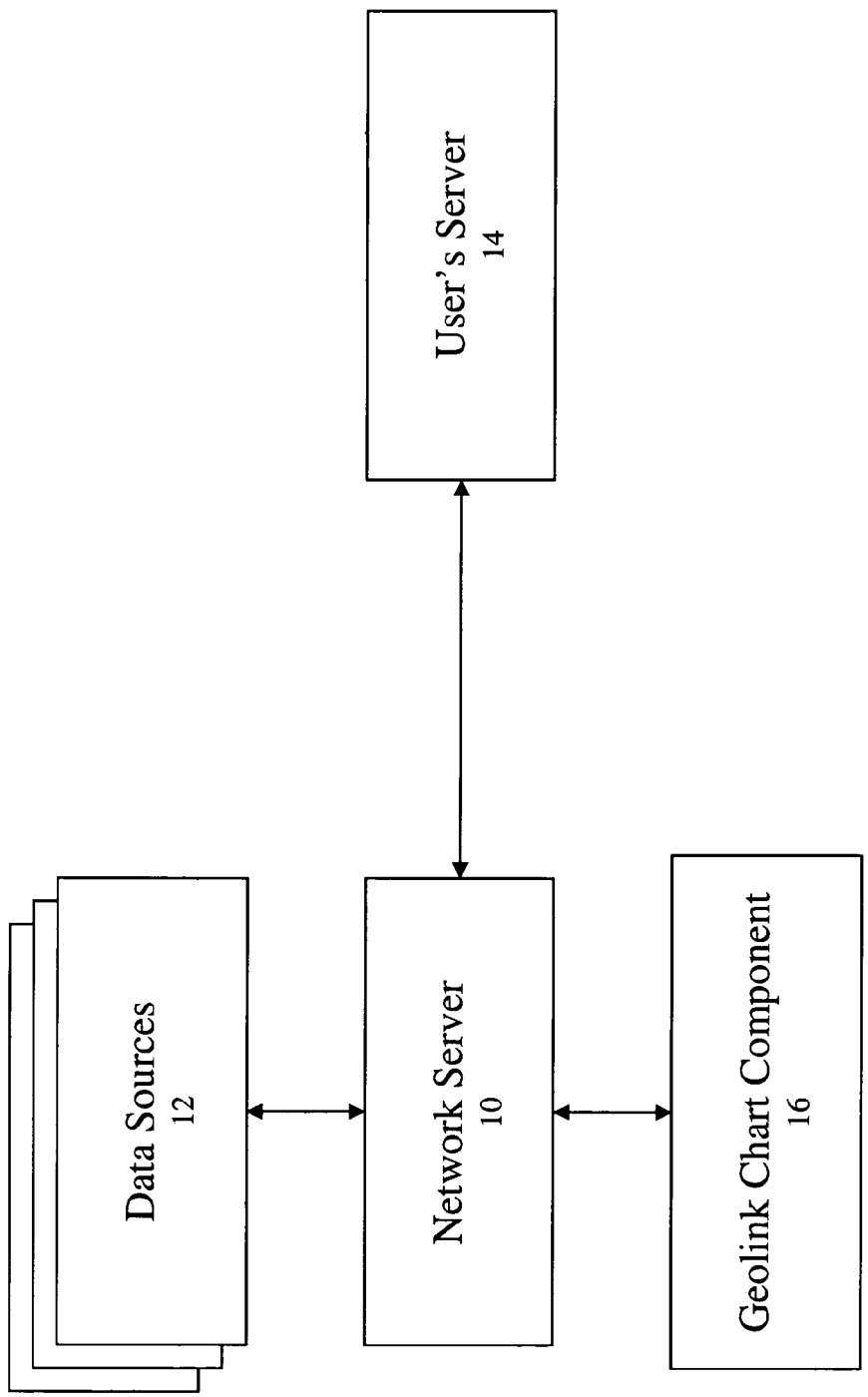
FIG. 1 is a block diagram illustrating the operation of generating excel trending charts according to the embodiment of the present invention.

Referring to FIG. 1, there is shown a general structure of major components used in generating EXCEL trending charts. The diagram mainly comprises a network server 10 having both a Microsoft® Excel application (not shown) and a geolink chart component 16. The geolink chart compound 16 is preferably part of the network server 10. The geolink chart component 16 has been developed by the Applicants and is written in VISUAL BASIC language used to process data of different formats and generate charts using the excel application. The geolink chart component 16 creates different methods or functions to create different types of charts and will generate charts based on user's criteria and the application from where they are calling. It is created as a Dynamic Linked Library (DLL) component and registered on the network server 10. The network server 10 recognizes and realizes where the component is in the server. Generally speaking, network server 10 searches into the registry to see if any component exists in the server and if it exists, the server will determine the functions being added by the component. This registration of the geolink component 16 in the network server 10 avoids the downloading of the component in every user's servers and/or PCs. Due to the geolink chart component 16 created and added only to the network server 10, it takes off a lot of burden on the registration of the component to occur in every user's server or PC. Also, the network server 10 can generate and forward the charts to the users without having to be concerned whether users are registered or not.

Figure 2A:
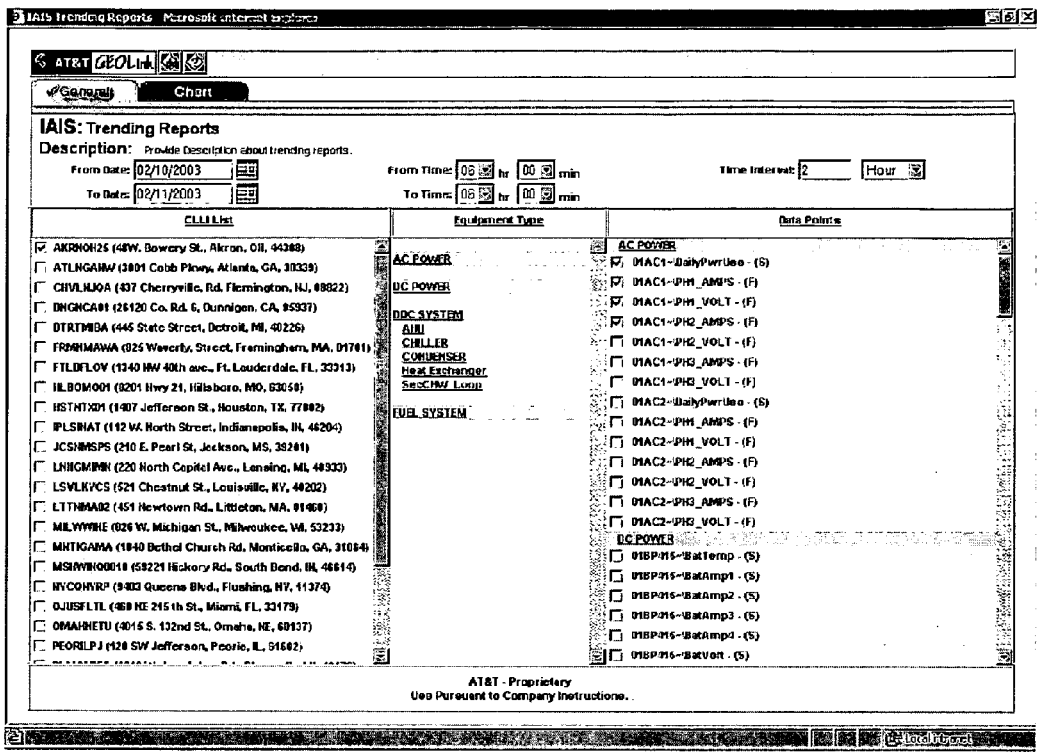
FIG. 2A shows a screen shot of search screen showing various search criteria.

The network server 10 is directly linked to a user's server 14, which may preferably be user's personal computer (PC), laptop, cell phone, PDA, etc. Although not shown, Microsoft® Excel application, by default is also installed in the user's server 14. The network server 10 presents the user on his or her server 14 with a screen shot 20, as shown in FIG. 2A. The screen shot 20 is an example of a search screen available to several different users in IAIS application. The search criteria is pre-defined to meet the needs of preferably all the users. The user will select the search criteria in this screen 20 to generate the chart. The main objects that make up the user interface are date range 21, time interval 22, CLLI list (Buildings) 23, equipment type 24, various data points 25 as shown in FIG. 2. These objects are various search criteria for a user to choose from. The network server 10 has the capability of storing and accessing huge network related data. The network server 10 retrieves the data from various data sources 12 according to the search criteria chosen by the user and the application used by the user. The network server 10 will then format the data by creating different two-dimensional arrays which are passed on to the geolink chart component 16. The geolink chart component 16 will process the data, create the chart on the server 10 using EXCEL application and will further load it on the user's server 14, preferably on user's browser. Preferably the geolink chart component 16 will create and support all different chart types supported by EXCEL. This way the users need not save the charts at any time. Whenever the user wants, they can generate the charts on fly by accessing the web application (not shown) in the user's server 14. The charts created on the network server 10 are deleted periodically.

The EXCEL chart component 16 of FIG. 1 can be used for any kind of application without any modifications. The data retrieved by the network server 10 is in several different formats, which is used by the geolink chart component 16 to draw the charts. Users need not maintain different types of spread sheet templates. This is mainly because each application is programmed in such a way, that depending upon user's search criteria, the data will be retrieved from various data sources 12 and formatted into different arrays by the application server 10 to be forwarded to the geolink chart component 16 to draw the chart. Furthermore, users are not required to enter any data for viewing charts. The user merely needs to choose the search criteria as shown in FIG. 2A. Once the user chooses the search criteria, he or she has to hit the "charts" 26 tab in the screen shot of FIG. 2A to view the chart in FIG. 2B for his or her search criteria. Normally, this entire process of generating chart will not take more than 30 seconds. In fact, if the data is less, chart in FIG. 2B will be generated and loaded on the user's browser in less than 10 seconds.

Figure 2B:
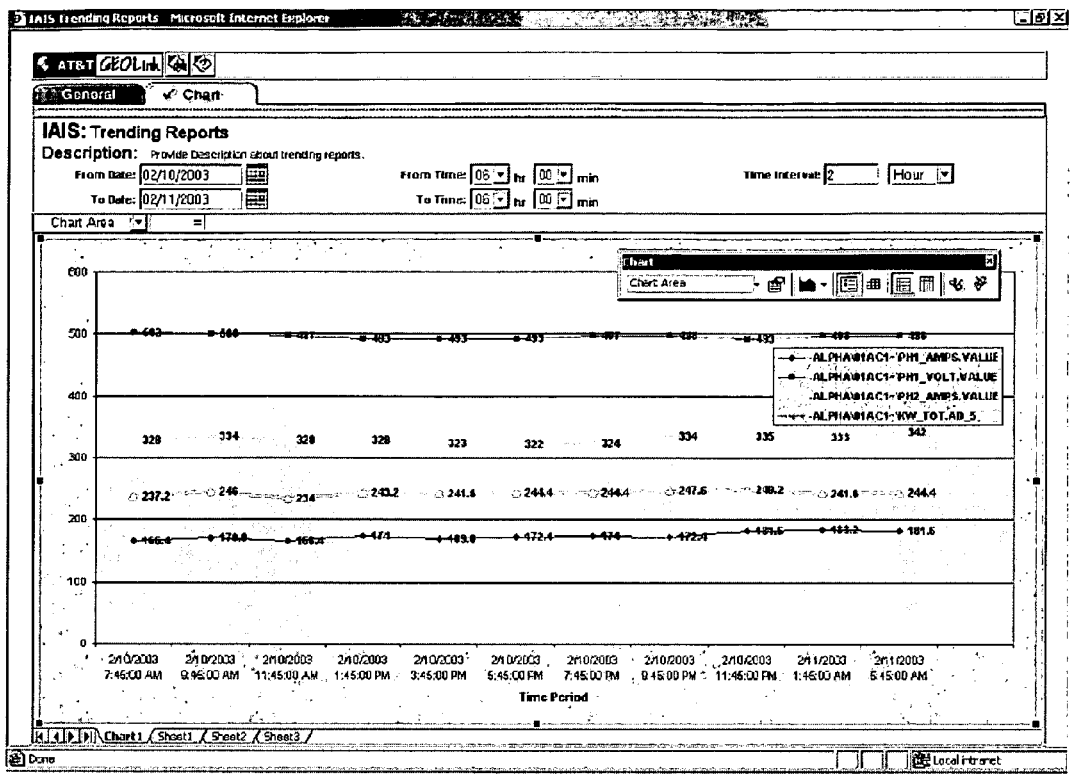
FIG. 2B shows a result screen shot of a line chart for the selected search criteria.

The chart in FIG. 2B is an example of a result screen which displays a 2-dimensional line chart for the selected search criteria which is loaded on the user's browser. Besides a 2D line chart, the geolink chart component 16 can generate other different types of charts such as Bar Chart, 3D surface chart, 3D line chart etc. Since the chart is opened on the EXCEL application in user's browser, all different chart types supported by EXCEL can be generated and viewed by the user. Moreover, because the chart is loaded on the user's browser, it provides the ability to user to change the chart into different types supported by EXCEL. The user is able to view the line chart in FIG. 2B into different other types of charts by using the EXCEL chart toolbar button 28. In this way, users need not install any other software to generate charts for analyzing the data.

Figure 3A:
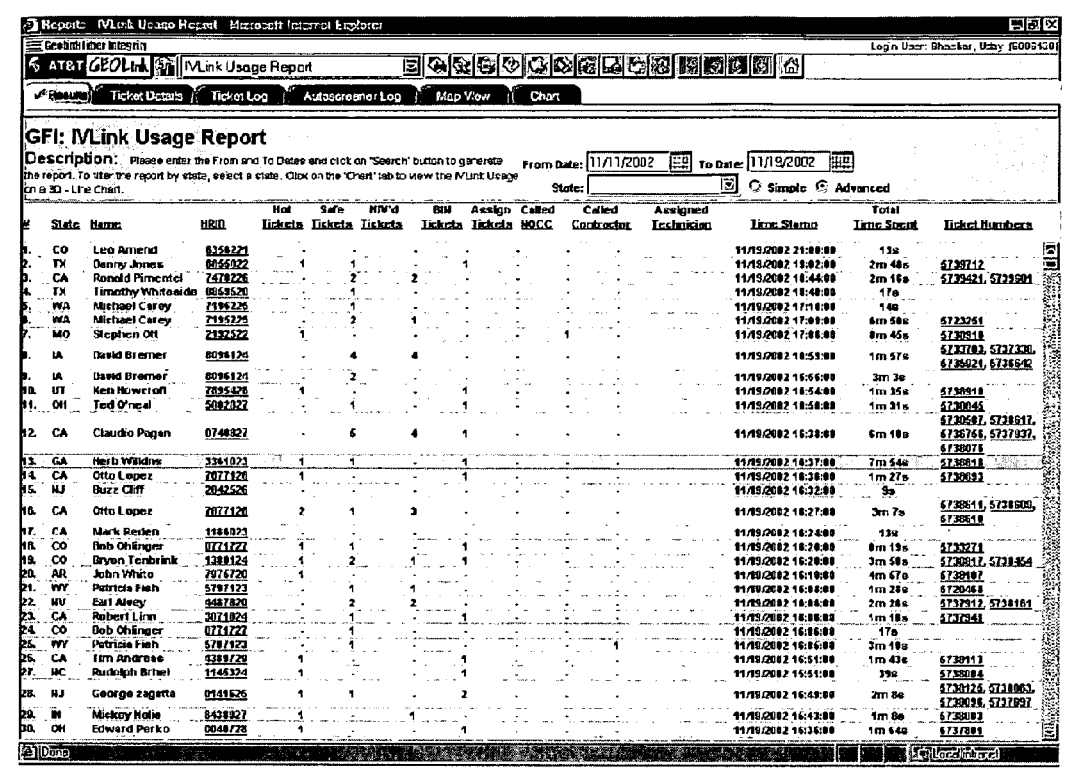
Figure 3B:
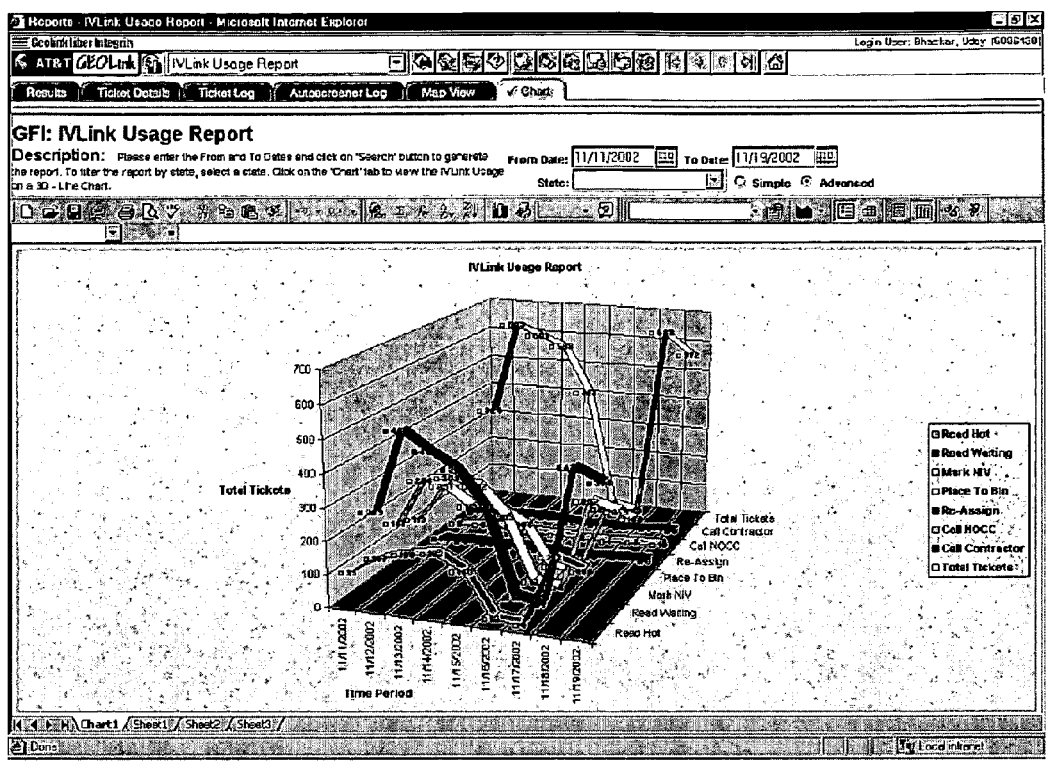
FIG. 3B illustrates a 3D line chart for the usage report data of FIG. 3A.
Figure 3C:
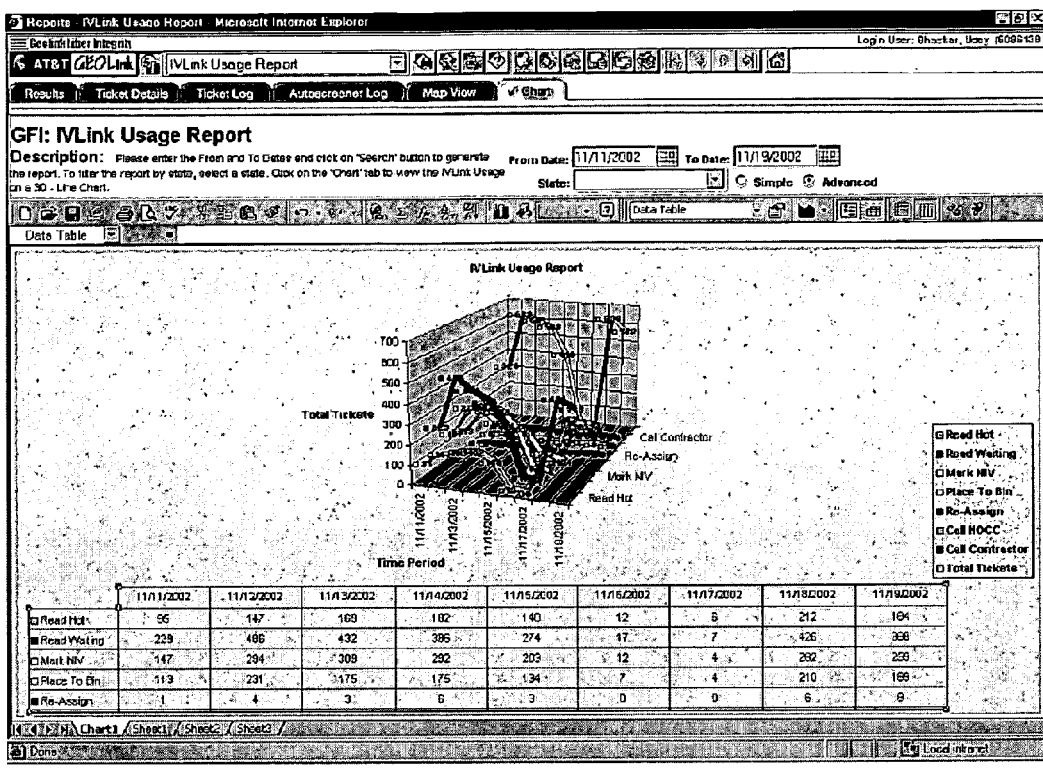
FIG. 3C illustrates a 3D line chart with data displayed on the chart for the usage report data of FIG. 3B.
Figure 3D:
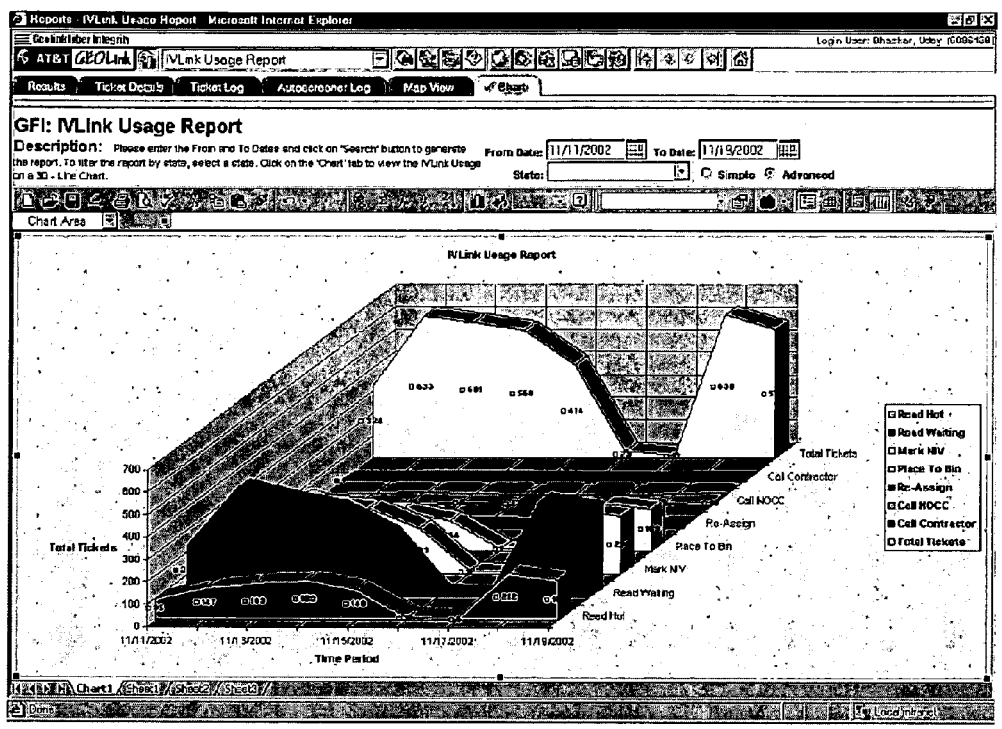
FIG. 3D illustrates a 3D area chart for the usage report data of FIG. 3A.

Another example of a reports result screen is shown in FIG. 3A. The data on this report is generated for the given search conditions. Users can generate the chart for this data by clicking on the "charts" 26 tab in FIG. 3A to view the three-dimensional line chart in FIG. 3B. Similarly a three-dimensional line chart with data displayed on the chart can be generated as shown in FIG. 3C. FIG. 3D shows a three-dimensional area chart generated from the data in FIG. 3A. So, it is clear that users can view the data in several different chart formats. And, more importantly, these charts can be generated and viewed by the user without installing any component or a third party software on user's server.

While the invention has been described in relation to the preferred embodiments with several examples, it will be understood by those skilled in the art that various changes may be made without deviating from the spirit and scope of the invention as defined in the appended claims.

What is claimed is:

1. A method of automatically generating charts, comprising:
    receiving search criteria from users via a server wherein said search criteria is received at a network server;
    recognizing an application used on the server;
    retrieving data from data sources based on the search criteria received and the application, wherein said data includes various formats;
    formatting the data into different arrays;
    generating at least one or more charts from the different arrays wherein said one or more charts are generated by a geolink chart component developed on the network server;
    presenting the at least one chart to the user, wherein the chart is generated and presented without installing any additional component on the server.

2. The method of claim 1 wherein said search criteria is pre-defined to meet needs of the users.

3. The method of claim 1 wherein said search criteria is a list of information selected by the user.

4. The method of claim 3 wherein said information is displayed to the user in a table format.

5. The method of claim 1, wherein said application includes Microsoft® Excel, or Microsoft®Visual Basic or web browser or combination thereof.

6. The method of claim 5 wherein said charts generated are supported by the Microsoft® Excel application.

7. The method of claim 5 wherein the chart is presented to the user via the web browser application.

8. The method of claim 1 wherein said charts are generated to analyze the data.

9. The method of claim 1 wherein said chart is a two-dimensional chart.

10. The method of claim 1 wherein said chart is a three-dimensional chart.

11. The method of claim 1 wherein said chart includes a line chart, a bar chart, a surface chart or a combination thereof.

12. A system for automatically generating charts, comprising:
    a network server for receiving a search criteria from users via a server and recognizing an
    at least one source linked to the network server, wherein said network server retrieves data from said at least one data source based on the search criteria received and the application and formats the data into different arrays;

a geolink chart component linked to the network server for generating at least one or more charts from the different arrays and forwarding the charts to the network server to be presented to the user via said server without installing any additional component on the server.

13. The system of claim 12 wherein said search criteria is pre-defined to meet needs of the users.

14. The system of claim 12 wherein said data includes various formats.

15. The system of claim 12 wherein said application includes Microsoft® Excel, or Microsoft® Visual Basic, or web browser or combinations thereof.

16. The system of claim 15 wherein said charts generated are supported by the Microsoft® Excel application.

17. The system of claim 15 wherein said charts are presented to the user via the web browser application.

18. The system of claim 12 wherein said charts are generated to analyze data.

\* \* \* \* \*